(12) United States Patent
Zanganeh et al.

(10) Patent No.: US 11,635,253 B2
(45) Date of Patent: *Apr. 25, 2023

(54) GAS SEPARATION SYSTEM WITH AUTO-REFRIGERATION AND SELECTIVE RECYCLE FOR CARBON DIOXIDE CAPTURE AND COMPRESSION

(71) Applicants: Kourosh Zanganeh, Ottawa (CA); Ahmed Shafeen, Kanata (CA)

(72) Inventors: Kourosh Zanganeh, Ottawa (CA); Ahmed Shafeen, Kanata (CA)

(73) Assignee: HER MAJESTY THE QUEEN IN RIGHT OF CANADA AS REPRESENTED BY THE MINISTER OF NATURAL RESOURCES, Ottawa (CA)

( * ) Notice: Subject to any disclaimer, the term of this patent is extended or adjusted under 35 U.S.C. 154(b) by 327 days.

This patent is subject to a terminal disclaimer.

(21) Appl. No.: 16/998,421

(22) Filed: Aug. 20, 2020

(65) Prior Publication Data
US 2020/0378680 A1 Dec. 3, 2020

Related U.S. Application Data

(62) Division of application No. 15/246,908, filed on Aug. 25, 2016, now Pat. No. 10,753,679, which is a
(Continued)

(51) Int. Cl.
*F25J 3/02* (2006.01)
*B01D 53/00* (2006.01)
(Continued)

(52) U.S. Cl.
CPC .......... *F25J 3/0266* (2013.01); *B01D 53/002* (2013.01); *B01D 53/62* (2013.01); *F25J 3/067* (2013.01);
(Continued)

(58) Field of Classification Search
CPC ........ F25J 3/0266; F25J 3/067; F25J 2205/02; F25J 2210/04; F25J 2210/70;
(Continued)

(56) References Cited

U.S. PATENT DOCUMENTS 3,614,872 A 10/1971 Tassoney et al.
4,417,449 A 11/1983 Hegarty et al.
(Continued)

FOREIGN PATENT DOCUMENTS

EP 1319911 A1 6/2003
EP 2023066 A1 2/2009
WO 2008099357 A1 8/2008

OTHER PUBLICATIONS

Supplementary European Search Report issued in Appln. No. EP 10849627.4 dated Nov. 8, 2012 (8 pages).
(Continued)

*Primary Examiner* — Joel M Attey
(74) *Attorney, Agent, or Firm* — Flynn Thiel, P.C.

(57) ABSTRACT

A system and method for capturing and separating carbon dioxide from mixed gas streams. The gas stream is processed in a structure including a compression module comprising a plurality of compressors, intercoolers and interstage condensate separators. The flow path from the compression module includes a plurality of flow separators, gas stream splitters, heat exchangers and at least a first mixer and a first expander. The gas stream is sequentially compressed and cooled to form process condensate and separate it from the compressed gas stream. The gas stream is further dried and cooled to liquefy carbon dioxide and separate it from the non-condensable portion. Selective expansion of liquid carbon dioxide streams provides cooling for the system, and further energy efficiency is achieved by selective recycling of portions of gas streams, allowing for
(Continued)

18 Claims, 14 Drawing Sheets

Related U.S. Application Data division of application No. 13/389,909, filed as application No. PCT/CA2010/000572 on Apr. 16, 2010, now abandoned.

(51) Int. Cl.
*B01D 53/62* (2006.01)
*F25J 3/06* (2006.01)

(52) U.S. Cl.
CPC ..... *B01D 2257/504* (2013.01); *F25J 2205/02* (2013.01); *F25J 2210/04* (2013.01); *F25J 2210/70* (2013.01); *F25J 2215/02* (2013.01); *F25J 2215/80* (2013.01); *F25J 2220/80* (2013.01); *F25J 2220/82* (2013.01); *F25J 2230/30* (2013.01); *F25J 2235/80* (2013.01); *F25J 2240/02* (2013.01); *F25J 2240/90* (2013.01); *F25J 2245/02* (2013.01); *F25J 2270/02* (2013.01); *F25J 2270/04* (2013.01); *F25J 2270/06* (2013.01); *F25J 2270/90* (2013.01); *F25J 2280/10* (2013.01); *Y02C 20/40* (2020.08)

(58) Field of Classification Search
CPC .. F25J 2215/02; F25J 2215/80; F25J 2220/80; F25J 2230/30; F25J 2235/80; F25J 2240/02; F25J 2245/02; F25J 2270/02; F25J 2270/04; F25J 2270/06; F25J 2270/90; F25J 2280/10; B01D 53/002; B01D 52/002; B01D 2257/504; Y02C 20/40
USPC ......................................................... 62/617
See application file for complete search history.

(56) References Cited

U.S. PATENT DOCUMENTS

| | | | |
|---|---|---|---|
| 5,467,722 A | 11/1995 | Meratla | |
| 6,070,431 A | 6/2000 | Howard | |
| 6,301,927 B1 | 10/2001 | Reddy | |
| 2006/0107691 A1* | 5/2006 | Howard | F25J 3/0252 62/928 |
| 2007/0221541 A1 | 9/2007 | McClanahan et al. | |
| 2008/0176174 A1* | 7/2008 | White | B01D 63/02 431/115 |
| 2008/0196587 A1* | 8/2008 | Ha | F25J 3/04533 203/99 |
| 2008/0236117 A1 | 10/2008 | Zhang et al. | |
| 2008/0276800 A1 | 11/2008 | Lourenco et al. | |
| 2009/0298957 A1 | 12/2009 | Gauthier et al. | |
| 2010/0024476 A1* | 2/2010 | Shah | B01D 53/002 95/41 |
| 2012/0000243 A1* | 1/2012 | Bough | C01B 3/16 62/617 |

OTHER PUBLICATIONS

Office Action issued in Appln. No. EP 10849627.4 dated Nov. 23, 2012 (9 pages).
European Search Report issued in Appln. No. EP 13197362.0 dated May 26, 2014 (7 pages).
Office Action issued in Appln. No. EP 10849627.4 dated Oct. 23, 2015 (6 pages).
Kourosh E. Zanganeh et al.; "Comparative Performance Evaluation of CO2 Capture and Compression Processes for Advanced Oxy-Fuel Power Plants"; 2006; pp. 193-204 (13 pages).
Wilkinson et al.; "Oxyfuel Conversion of Heaters and Boilers for CO2 Capture"; May 5, 2003; pp. 1-13 (14 pages).
Form PCT/ISA/220 issued in PCT/CA2010/000572 dated Jan. 14, 2011 (1 page).
Form PCT/ISA/237 issued in PCT/CA2010/000572 dated Jan. 14, 2011 (6 pages).
Form PCT/ISA/210 issued in PCT/CA2010/000572 dated Jan. 14, 2011 (4 pages).
Kourosh E. Zanganeh et al.; "Oxy-Fuel Technology: Its Current State and Opportunities for Greenhouse Gas Mitigation and Pollution Prevention"; 2007; pp. 1-10 (10 pages).
Ashkan Beigzadeh et al.; "Optimized Multi-pollutant Control in Oxy-fuel Combustion Systems using CO2 Capture and Compression Process"; Energy Procedia; 2013; pp. 1-10 (10 pages).
Ashkan Beigzadeh et al.; "Optimized Multi-pollutant Control in CO2 Capture and Compression Process for Oxy-fuel Combustion Systems"; IEA GHGT-12; 2014 (16 pages).
Kourosh E. Zanganeh et al.; "Gas Turbine Integrated High-Efficiency Oxy-Fuel Combustion Process With CO2 Capture"; GTZ008-51456; 2008; pp. 1-6 (6 pages).
Carlos Salvador et al.; "Experimental Investigation and Model Validation on the Effects of Impurities on CO2 Separation Using a Bench-scale, High Pressure CO2 Test Cell"; 2011; pp. 1-3 (3 pages).
Kourosh E. Zanganeh et al.; "CO2 Capture and Development of an Advanced Pilot-Scale Cryogenic Separation and Compression Unit"; Energy Procedia; 2008 (6 pages).
European Office Action issued in Appln. No. 10 849 627.4 dated Jun. 10, 2016 (5 pages).

\* cited by examiner ers or membrane technology. Oxy-fuel is omitted for brevity.

GAS SEPARATION SYSTEM WITH AUTO-REFRIGERATION AND SELECTIVE RECYCLE FOR CARBON DIOXIDE CAPTURE AND COMPRESSION

CROSS-REFERENCE TO RELATED APPLICATIONS

This is a divisional of prior U.S. Ser. No. 15/246,908, filed Aug. 25, 2016 and U.S. Ser. No. 13/389,909, filed Feb. 10, 2012, which is the National Stage of International Application No. PCT/CA2010/000572, filed Apr. 16, 2010, the disclosures of which are hereby incorporated by reference in their entirety herein.

FIELD OF THE INVENTION

The invention relates to systems for capturing and separating carbon dioxide from mixed gas streams. In particular, the invention relates to an auto-refrigerated system and method for separating carbon dioxide using multiple compression, intercooling and condensates separation stages, and selective gas recycling.

BACKGROUND OF THE INVENTION

The objective of carbon dioxide capture is to address the increasing problem of the effects of the emission of carbon dioxide (a greenhouse gas) into the atmosphere, by separating carbon dioxide from gaseous products of various processes, and deliver the separated carbon dioxide for further use, processing, and storage. Recently, the possibility of underground storage in deep geological formations has been given much consideration, but the economic and practical difficulties in separating the carbon dioxide from mixed gas streams have not been satisfactorily addressed.

Currently, there are three main approaches to capturing carbon dioxide from the combustion of fossil fuels, namely, pre-combustion capture, postcombustion capture, and oxy-fuel combustion. For a conventional air-fired coal power plant, where the normal carbon dioxide concentration in the boiler exit flue gas could be around 15% by volume, post-combustion capture may be an appropriate option. In this process, the carbon dioxide from the flue gas can be removed by scrubbing with chemical solvents, such as an amine solution, or various sorbents. However, advanced technologies such as gasification or oxy-fuel combustion can make possible alternative means of carbon dioxide capture. For a gasification system, the carbon dioxide can be more effectively removed using pre-combustion capture systems using physical solvents or membrane technology. Oxy-fuel combustion provides an advantageous approach to carbon dioxide capture, whereby combustion takes place in an oxygen-enriched environment, thus producing a flue gas stream which is rich in carbon dioxide, and thus can readily be captured and compressed using non-solvent based processes, such as low-temperature gas separation, for pipeline transport. The selection of an appropriate carbon dioxide capture process for a particular application thus depends on several factors including the combustion technology adopted, the flue gas composition and condition, and the end-user's requirement.

Known processes for carbon dioxide capture and subsequent purification via a compression and cooling system have been primarily confined to applications in the food industry and some chemical plant applications. In many of these applications, the concentration of carbon dioxide in the inlet gas stream is often greater than 90% and relatively free from the sort of contaminates typical of most combustion processes, e.g. $SO_x$ and $NO_x$. A typical capture plant consists of a pre-cleaning stage, a compression stage and a liquefaction stage. In the pre-cleaning stage the inlet gas stream is cleaned of solid particles and/or impurities such as mercury, $SO_x$, etc., and then is passed through an initial demister unit before entering the compression stage. In the compression stage, the gas stream is compressed, cooled (which may be in multiple stages and forms condensates that can be removed in condesate separator vessels), and then passed through a drier, to further dry the gas stream. In the liquefaction stage, the gas stream is further cooled for liquefying the carbon dioxide and separating it from non-condensable gases to form the carbon dioxide product stream. The non-condensable gases such as argon and oxygen or nitrogen, are vented along with a small percentage of carbon dioxide in gaseous form to the atmosphere. Some systems partially vent non-condensable gases through the dryer to assist regeneration of the dryer material. Depending on the downstream process, the carbon dioxide may be sent to insulated storage tanks, used directly, or transported in a pipeline or other means of transportation for underground storage.

For the separation of carbon dioxide from the flue gas streams of fossil energy conversion systes, various different processes are known and used. These processes currently include the use of membranes, chemical and physical solvents, sorbents, cryogenic or low-temperature separation. The main factors involved in the selection of a suitable separation process include the energy conversion system, the concentration of carbon dioxide expected in the flue gas stream, the purity requirement of the carbon dioxide product stream, the energy consumption, and the cost and efficiency of capture. For flue gas streams with higher concentrations of carbon dioxide, the preferred approach is to use a process including the low temperature separation of gas mixtures. This can be done through a simple multi-stage direct compression and cooling process, or more complex processes that might involve different ways of cooling, compression or recycling of the flue gas to liquefy and separate the carbon dioxide from other gases.

However, each of these processes suffers from various disadvantages, in particular the complexity of the systems and the size of the equipment, or the amount of energy required, and thus the capital and operation costs of the additional plant components, and the costs associated with providing the necessary energy for refrigeration.

It has now been found that a system can be provided for more efficient and cost-effective separation of carbon dioxide from carbon dioxide rich gas streams emitted from fossil fuel and other industrial plants using a new low-temperature gas separation process that includes both auto-refrigeration and gas recycling. In particular, it has been found that an approach can be selected which provides compression to the inlet gas streams in multiple stages with inter-stage cooling and condensate removal, while using the energy in the compressed gas to provide cooling to the incoming stream, and at the same time using an expansion stage before recycling a portion of the gas back to the compressor, at some intermediate stage within the multiple compression stages. It has further been found that a novel arrangement of process flow pathways can be provided with respect to separation vessels, multi-pass heat exchangers, gas recycle pathways, and gas throttling to reduce the overall energy demand and temperature of the process without the use of external refrigeration means, in a simple and compact system, without the disadvantages of known processes and systems.

SUMMARY OF THE INVENTION

The present invention provides a system of carbon dioxide capture from a mixed gas stream input, and methods of operating the system, and provides various configurations and options for the system and methods.

In each of the embodiments of the invention, the carbon dioxide rich feed gas is sent to a low temperature separation unit of the invention, and carbon dioxide is liquefied and separated as the primary product, while non-condensable impurities are separated as a vent and sent for further processing or to the atmosphere.

The incoming carbon dioxide-rich gas stream is preferably pretreated as necessary to remove specifically targeted solid particles and/or impurities such as mercury, and $SO_x$. The incoming gas stream is preferably also dried after compression and before recovery of the carbon dioxide, in the process which includes compression and cooling at different stages with removal of condensates, and subsequent liquefaction and separation of the carbon dioxide as the product stream, without the need for any external cooling bythrotelling the liquid carbon dioxide stream to provide cooling to earlier stages, while expanding and recycling a portion of the compressed gas stream, thus providing significant commercial and technical advantage over the prior art.

The system of the present invention is capable of handling a feed gas stream with a carbon dioxide concentration at least as low as 30%, and preferably higher, up to and exceeding 90%. It has been found that for carbon dioxide concentrations of the feed gas stream anywhere between 30% and 90%, the carbon dioxide purity in the product stream remains at least 94%, more specifically in some cases greater than 97%, and more specifically in few cases greater than 99%.

Preferably, the system is operated with a maximum pressure not exceeding about 35 to 45 bar absolute, for the purpose of energy savings and overall efficiency, and in some cases preferably 25 bar to 35 bar absolute.

In a first broad embodiment, the invention therefore seeks to provide a method for separating carbon dioxide from a mixed gas stream, the method comprising the steps of:

(a) providing a processing structure including a compression module comprising at least a plurality of compressors, a plurality of intercoolers with inter-stage condensate separators, the processing structure further including a plurality of flow separators, a plurality of gas stream splitters, a plurality of heat exchangers, a plurality of mixers, at least a first expander, and a single throttle valve;

(b) delivering the mixed gas stream to the compression module;

(c) compressing and cooling the mixed gas stream through each of the plurality of compressors and intercoolers in sequence and ones of the plurality of heat exchangers to generate an output stream including liquid carbon dioxide and a gaseous stream;

(d) selectively removing the liquid carbon dioxide from the output stream in selected ones of the plurality of flow separators to generate from each selected flow separator a liquid carbon dioxide stream and a separated gaseous stream;

(e) selectively mixing in the first mixer at least two of the liquid carbon dioxide streams generated in step (d) to form a mixed liquid carbon dioxide stream;

(f) sending the mixed liquid carbon dioxide stream to the second mixer to form a second mixed carbon dioxide stream, throttling and removing the second mixed carbon dioxide stream from the processing structure;

(g) splitting selected ones of the separated gaseous streams to further cool the split streams to form liquid carbon dioxide and selectively repeating step (d) to separate the liquid carbon dioxide from other gases and selectively removing the other gases from the processing structure;

(h) selectively recycling the separated gaseous stream from at least one of the flow separators to at least one of the compressors selected from a second compressor and a subsequent compressor in the sequence in the compression module;

(i) selectively expanding selected one of the split stream to recover energy and to provide cooling to the processing structure;

Depending on the contents of the input mixed gas stream, the method can further comprise prior to step (c) the step of (b.1) pre-treating the mixed gas stream by removing at least one of water, particulate matter, mercury and other heavy metals, hydrogen chloride, hydrogen fluoride, nitrogen oxides, sulphur oxides and other sulphur derivatives from the mixed gas stream.

In a second broad embodiment, the invention seeks to provide a method for separating carbon dioxide from a mixed gas stream, the method comprising the steps of:

(a) delivering the mixed gas stream to a processing structure;

(b) compressing the mixed gas stream in at least two compression stages and subjecting the mixed gas stream to cooling and separating steps after each compression stage to produce a compressed gas stream;

(c) passing the compressed gas stream through a first heat exchanger to form a first two-phase flow;

(d) separating the first two-phase flow into a first liquid stream comprising at least 90% carbon dioxide and a first gas stream including residual carbon dioxide;

(e) splitting the first gas stream into a first gas stream branch and a second gas stream branch;

(f) passing the first gas stream branch through a second heat exchanger to form a second two-phase flow;

(g) separating the second two-phase flow into a second liquid stream comprising at least 90% carbon dioxide and a second gas stream including impurities and residual carbon dioxide;

(h) passing the second gas stream including impurities and residual carbon dioxide, in sequence through the second heat exchanger and the first heat exchanger to form a fourth gas stream comprising impurities and residual carbon dioxide;

(i) expanding the second gas stream branch to produce a third two-phase flow;

(j) separating the third two-phase flow into a third liquid stream comprising at least 90% carbon dioxide and a third gas stream including residual carbon dioxide;

(k) passing the third gas stream through the first heat exchanger and recycling it back to an intermediate stage of the compressor;

(l) passing the third liquid stream through a pressurizing means to raise the pressure of the third liquid stream to match the pressure of the first liquid stream, and thereafter mixing the first liquid stream with the third liquid stream in a first mixer to form a mixed fourth liquid stream;

(m) passing the second liquid stream through the second heat exchanger;

(n) mixing the mixed fourth liquid stream with the second liquid stream in a second mixer to form a fifth liquid stream;

(o) passing the fifth liquid stream through a throttle valve to form a first cold throttled stream including a gaseous portion and a liquid portion;

(p) passing the first cold throttled stream through the second heat exchanger and the first heat exchanger, in sequence, to form a product stream comprising at least 90% carbon dioxide.

Optionally, the method further comprises after step (o) the step of:

(o.1) passing the first cold throttled stream to a first additional separator to remove the gaseous portion of the first cold throttled stream to form a sixth gas stream, the liquid portion of the first cold throttled stream forming a sixth liquid stream;

(o.2) passing the sixth liquid stream through the second heat exchanger and the first heat exchanger, in sequence, to form a product stream comprising at least 90% carbon dioxide; and (o.3) recycling the sixth gas stream back to an intermediate stage after the first and before the last of the at least two compression stages of step (b).

Alternatively, the method further comprises after step (o) the step of:

(o.4) passing the first cold throttled stream to a first additional separator to remove the gaseous portion of the first cold throttled stream to form a sixth gas stream, the liquid portion of the first cold throttled stream forming a sixth liquid stream;

(o.5) passing the sixth liquid stream through the second heat exchanger and the first heat exchanger, in sequence, to form a product stream comprising at least 90% carbon dioxide;

(o.6) passing the sixth gas stream to a first additional compressor to form a compressed sixth gas stream; and (o.7) mixing the compressed sixth gas stream with the compressed gas stream of step (b).

In each of the embodiments of the methods of the invention, there are various optional and advantageous features which can be included, as discussed further below in relation to the drawings. These include, but are not limited to, the following.

The method can further comprise selectively removing oxygen from selected ones of each of the product or vent streams before removing the selected streams from the processing structure.

Preferably, the method further can comprise removing moisture by drying the compressed gas stream, before passing the compressed gas stream through a first heat exchanger, to form a dried compressed gas stream having a dew point temperature at least one degree C. lower than a lowest operational temperature of each of the steps of the method.

The pressurizing means preferably comprises a pump.

The fourth gas stream can be expanded in a vent stream expander to recover energy and to form a vent stream comprising impurities and residual carbon dioxide.

Further, the vent stream can be split into a first vent stream branch and a second vent stream branch; preferably the compressed gas stream and the first vent stream branch are passed through a first additional heat exchanger, and the second gas stream branch and the second vent stream branch are each passed through a second additional heat exchanger.

The second gas stream branch can be expanded in a main expander to recover energy, and to produce the third two-phase flow.

Preferably, the methods further comprise raising the pressure of the product stream to higher set pressure to form a pressurized product stream.

In a third broad embodiment, the invention seeks to provide a system for separating carbon dioxide from a mixed gas stream, the system comprising a processing structure including:

(a) a compression module comprising at least a plurality of compressors, a plurality of intercoolers with inter-stage condensate separators, and at least a dryer, the module being constructed and arranged to compress, cool and dry the mixed gas stream through each of the plurality of compressors in sequence to generate a first processing structure stream comprising an output stream;

(b) a plurality of heat exchange means for further cooling the output stream to form liquid carbon dioxide and for cooling of selected ones of a plurality of additional processing structure streams;

(c) a plurality of flow separation means for selectively removing the liquid carbon dioxide from gaseous portions of selected ones of the processing structure streams to generate at least one liquid carbon dioxide stream and at least one separated gaseous stream;

(d) a plurality of splitting means for splitting selected ones of the separated gaseous streams;

(e) at least two mixing means structurally connected in sequence for selectively mixing liquid carbon dioxide streams to form mixed liquid carbon dioxide streams;

(f) recycling means for selectively recycling the separated gaseous stream from at least one of the flow separation means to at least one of the compressors selected from a second compressor and a subsequent compressor in the sequence in the compression module;

(g) at least one expander means to selectively expand at least portions of the separated gaseous stream to recover energy and to provide cooling to the processing structure; and (h) a single throttle means downstream of the second mixer to selectively throttle at least one liquid carbon dioxide stream.

Preferably also, the system further comprises at least one pre-treatment means for removing from the mixed gas stream at least one of water, particulate matter, mercury and other heavy metals, hydrogen chloride, hydrogen fluoride, nitrogen oxides, sulphur oxides and other sulphur derivatives from the mixed gas stream.

Preferably also, the system further comprises oxygen removal means for selectively removing oxygen from at least one carbon dioxide or vent stream.

BRIEF DESCRIPTION OF THE DRAWINGS

The invention will now be described with reference to the drawings, in which.

DETAILED DESCRIPTION OF THE DRAWINGS

Figure 1:
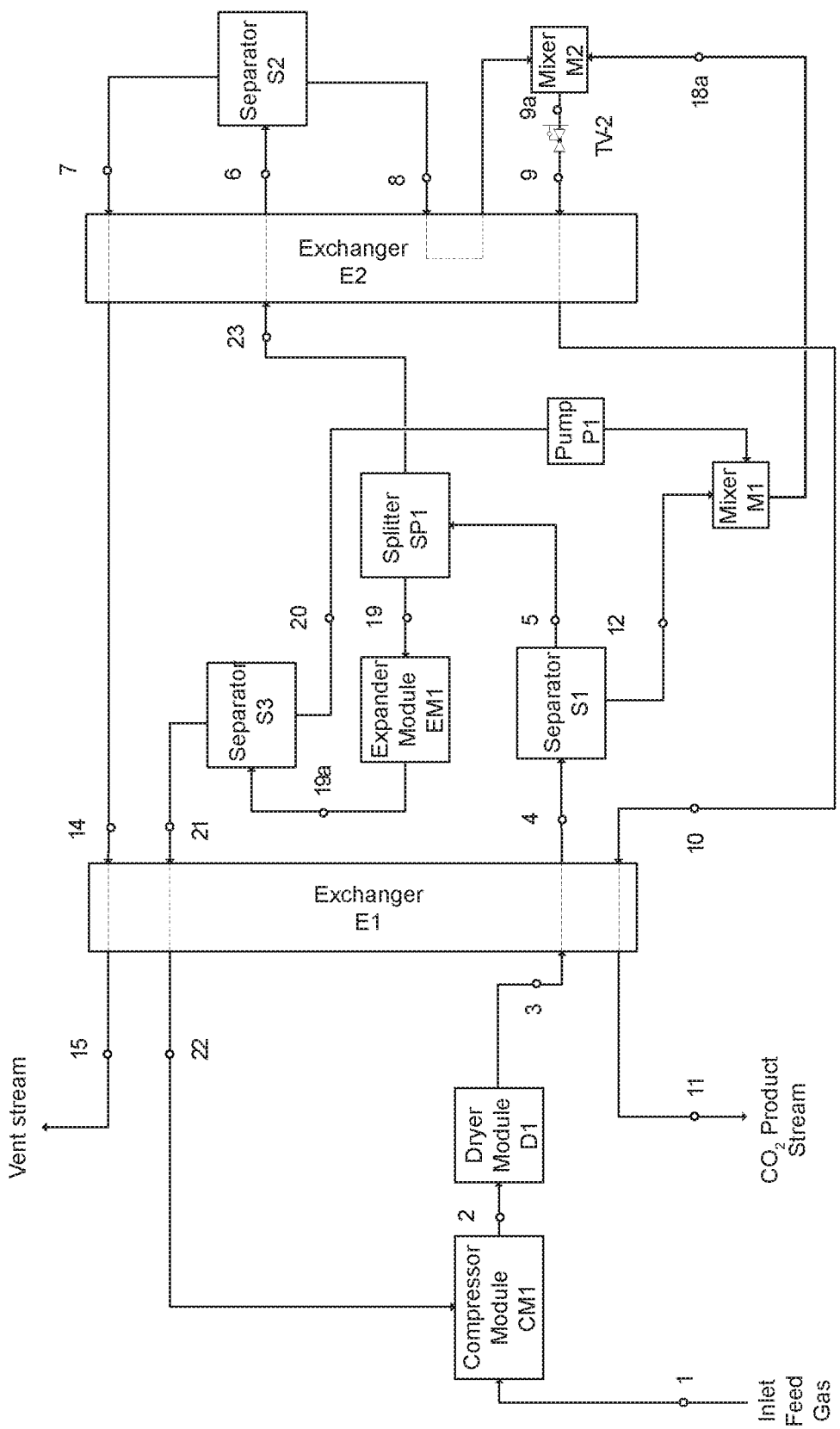
FIG. 1 is a schematic representation of a first embodiment of the invention.

Referring to FIG. 1, a first embodiment of the method and system of the invention is shown schematically. As depicted in FIG. 1, the inlet carbon dioxide rich gas stream enters the process structure as inlet feed gas in path 1, and is compressed in compressor module CM1, and substantially dehydrated in dryer module D1. The compressor block must consist of a minimum of two compression stages, preferably three or four, with inter-stage coolers and condensate separators. Dryer module D1 can comprise any suitable dryer system, such as a molecular sieve, where the process gas will not be contaminated but only be dried, to achieve a water dew point temperature equal to or lower than the gas stream temperature in path 9. In the event that this dew point temperature is not practical for any reason, based on factors such as cost or equipment, the next plausible temperature to be used is the dew point temperature at path 21. After leaving the dryer the gas stream proceeds in path 3 to the heat exchanger E1, where it is cooled, leading to a two-phase flow in path 4, from heat exchanger E1 to separator S1, where the two phases are separated. The gas stream leaving separator S1 passes in path 5 to splitter SP1, where it is split into two branches as follows.

The first branch flows in path 23 to and through heat exchanger E2, leaving in path 6 as a two phase flow, into separator S2. The gas stream leaving separator S2 consists of non-condensable gas phase impurities, such as argon, nitrogen, oxygen, and possibly $NO_x$ and $SO_x$, and residual carbon dioxide, which have remained in the gaseous state. This stream flows in path 7 to and through heat exchanger E2, and from heat exchanger E2 in path 14 to heat exchanger E1 and flows therefrom in path 15 to be exhausted to atmosphere by any suitable means (not shown) through a vent with or without a silencer in path 15. The liquid stream leaving separator S2 flows in path 8 to and through heat exchanger E2 to mixer M2, where it is mixed with flow in path 18a, discussed below, and the mixed stream 9a flows in path 9 through throttle valve TV2, back through heat exchanger E2, and flows in path 10 to heat exchanger E1, and leaves the system as in path 11 as a product stream.

The second branch from splitter SP1 flows in path 19 to and through expander module EM1, and as the gas passes through expander module EM1 it cools resulting in a two phase flow 19a to separator S3. The use of expander module EM1 allows for the production of necessary cooling for liquefaction in the system, and also for additional shaft output work, thereby enhancing the overall energy balance and improving the efficiency of the process. Once in separator S3, the gas and liquid phases are separated. The gas stream leaving separator S3 flows in path 21 through heat exchanger E1, leaving heat exchanger E1 in path 22, and is recycled back to an appropriate selected location in the compressor module CM1. This location must be subsequent to the inlet of path 1 into the compressor module CM1, i.e. the gas stream in path 22 must be returned to one of the intermediate compression stages within compressor module CM1.

The liquid stream from separator S3 flows in path 20 to pump P1, where its pressure is raised to match that of the liquid stream leaving separator S1 in path 12. The liquid stream in path 12 and the liquid stream leaving pump P1 in path 20 are combined in mixer M1. The combined liquid streams flow from mixer M1 in path 18a to mixer M2, to be mixed with the flow in path 8 from separator S2 and heat exchanger E2, to flow in path 9a to enter the throttle valve TV2 as described above. This diversion which takes place in path 18a allows for the maximum cooling effect from the throttling process occurring in path 9.

This configuration provides only one product stream, i.e. the flow in path 11, from the overall process, which allows for simplification of the carbon dioxide product piping, and of the multi-pass design for heat exchanger E1.

Figure 2:
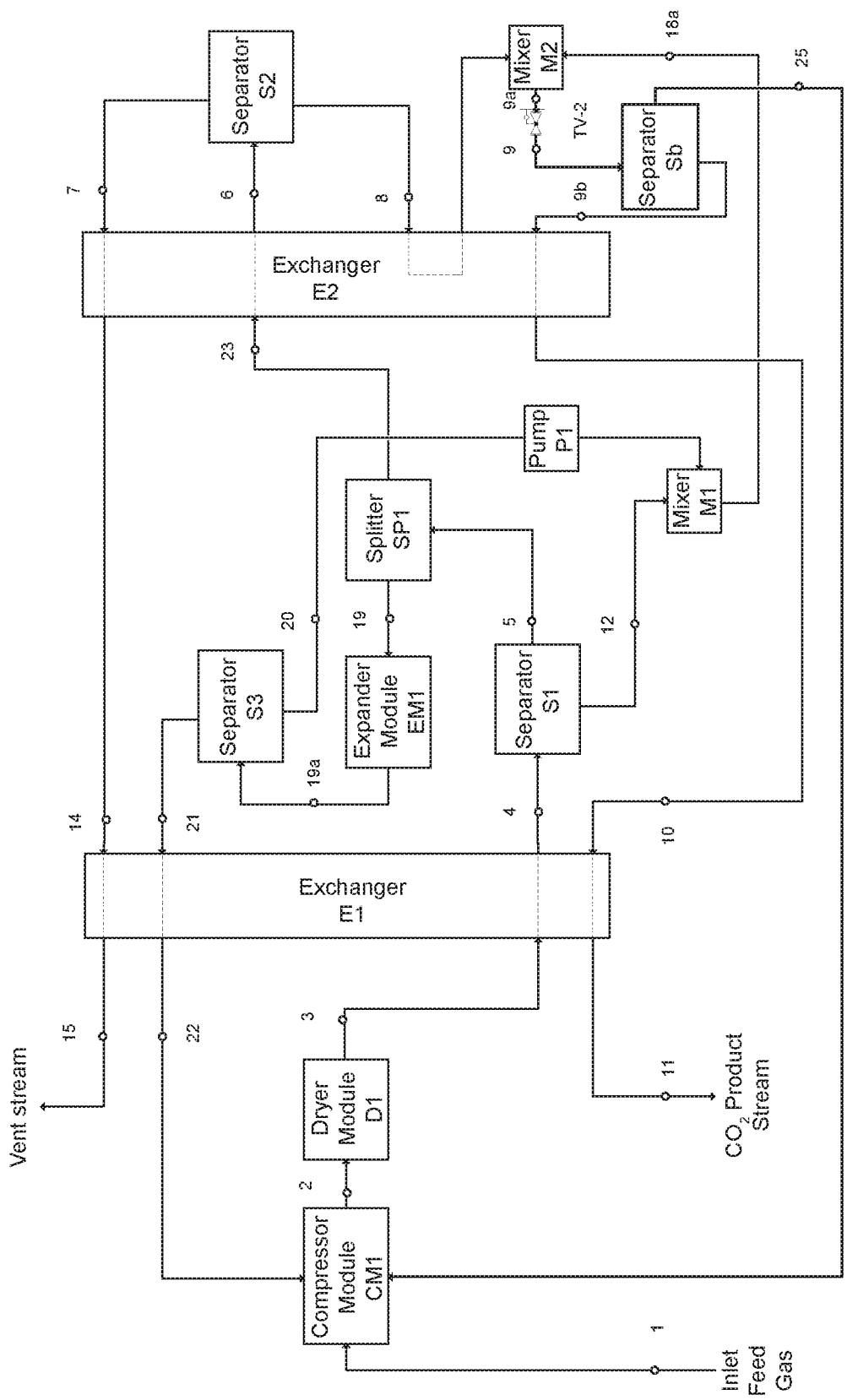
FIG. 2 and is schematic representation of a second embodiment of the invention, while FIG. 3 showing further features of the embodiment of FIG. 2.
Figure 3:
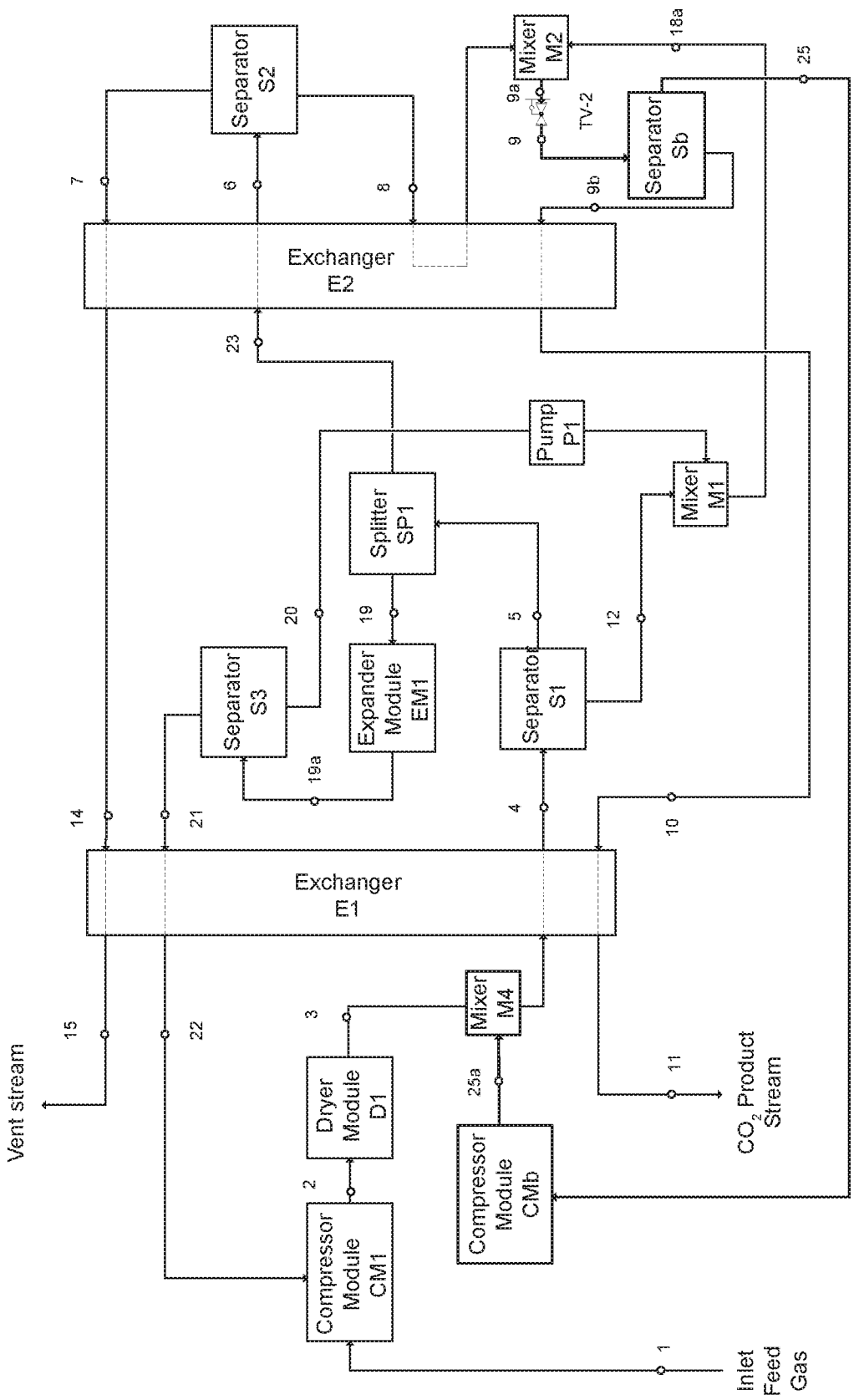

FIGS. 2 and 3 are schematic representations of a high purity configuration respresenting a second embodiment of the method and system of the invention. In this configuration, an additional separator Sb is added to path 9 down stream of throttle valve TV2. The liquid stream from the separator Sb is a highly pure carbon dioxide product stream, which flows in paths 10 and 11, as in the configuration shown in FIGS. 2 and 3. However, the gaseous stream leaving separator Sb is recycled back in path 25 to the compressor module CM1.

FIG. 3 is a further variant of the configuration of FIG. 2. In this configuration, the liquid stream from the separator Sb flows in paths 10 and 11 as in the configurations shown in FIG. 2. However, the gaseous stream from separator Sb flows in path 25 to an additional compressor, compressor module CMb, where it is further compressed. The compressed stream 25a leaving compressor module CMb flows to mixer M4, where it is combined with the outlet stream flowing in path 3 from dryer module D1, and the mixed flow passes from mixer M4 into heat exchanger E1. The configuration of FIG. 3 produces the same high purity of carbon dioxide in the product stream in path 11 as in the configuration of FIG. 2, but the configuration of FIG. 3 provides more flexibility to the overall operation of the high purity variant processes.

Figure 14:
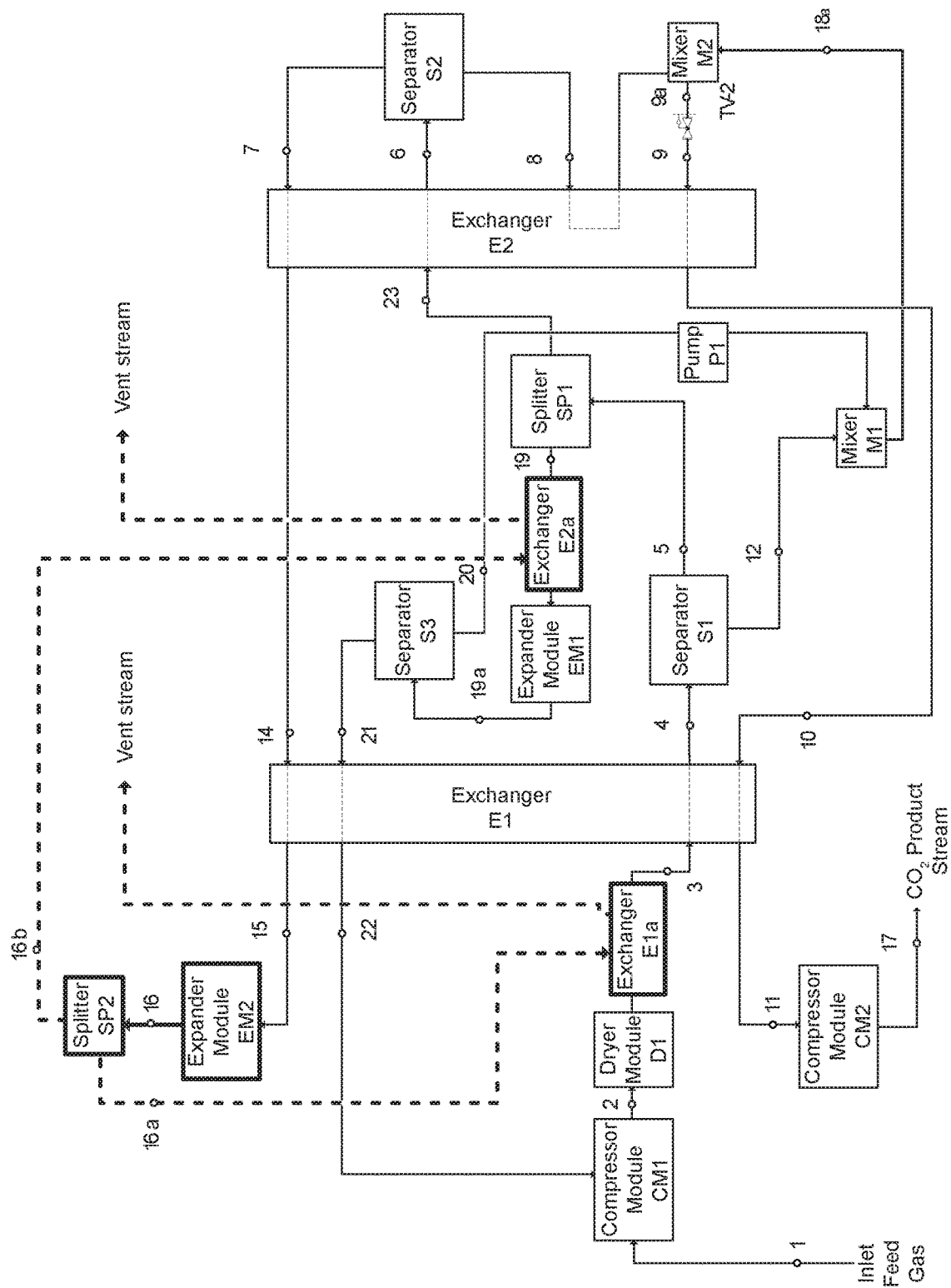
FIG. 14 is a schematic representation showing further features of the first and second embodiments of the invention.

FIG. 14 is yet another variant of FIG. 1. In this configuration, the gas stream 15 exiting heat exchanger E1 is expanded in a vent stream expander EM2 to recover energy and to form a vent stream 16 comprising impurities and residual carbon dioxide. Further, the vent stream 16 is split into two vent stream branches 16a and 16b; preferably, the vent stream branch 16a and the compressed gas stream 3 are each passed through an additional heat exchanger E1a, and the gas stream branch 19 and the vent stream branch 16b are each passed through another additional heat exchanger E2a.

Figure 4:
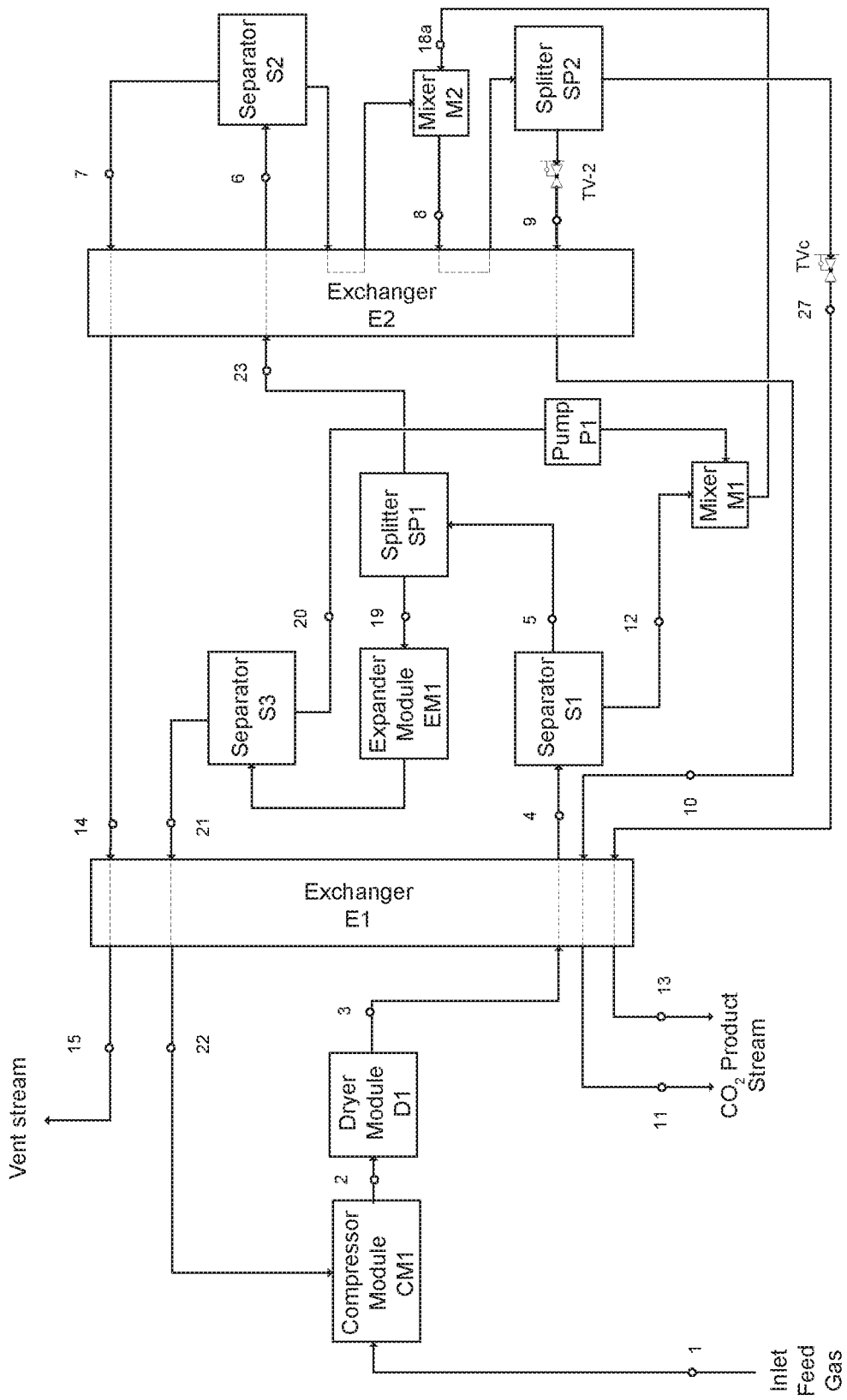
FIG. 4 is a schematic representation of a second embodiment of the invention.
Figure 5:
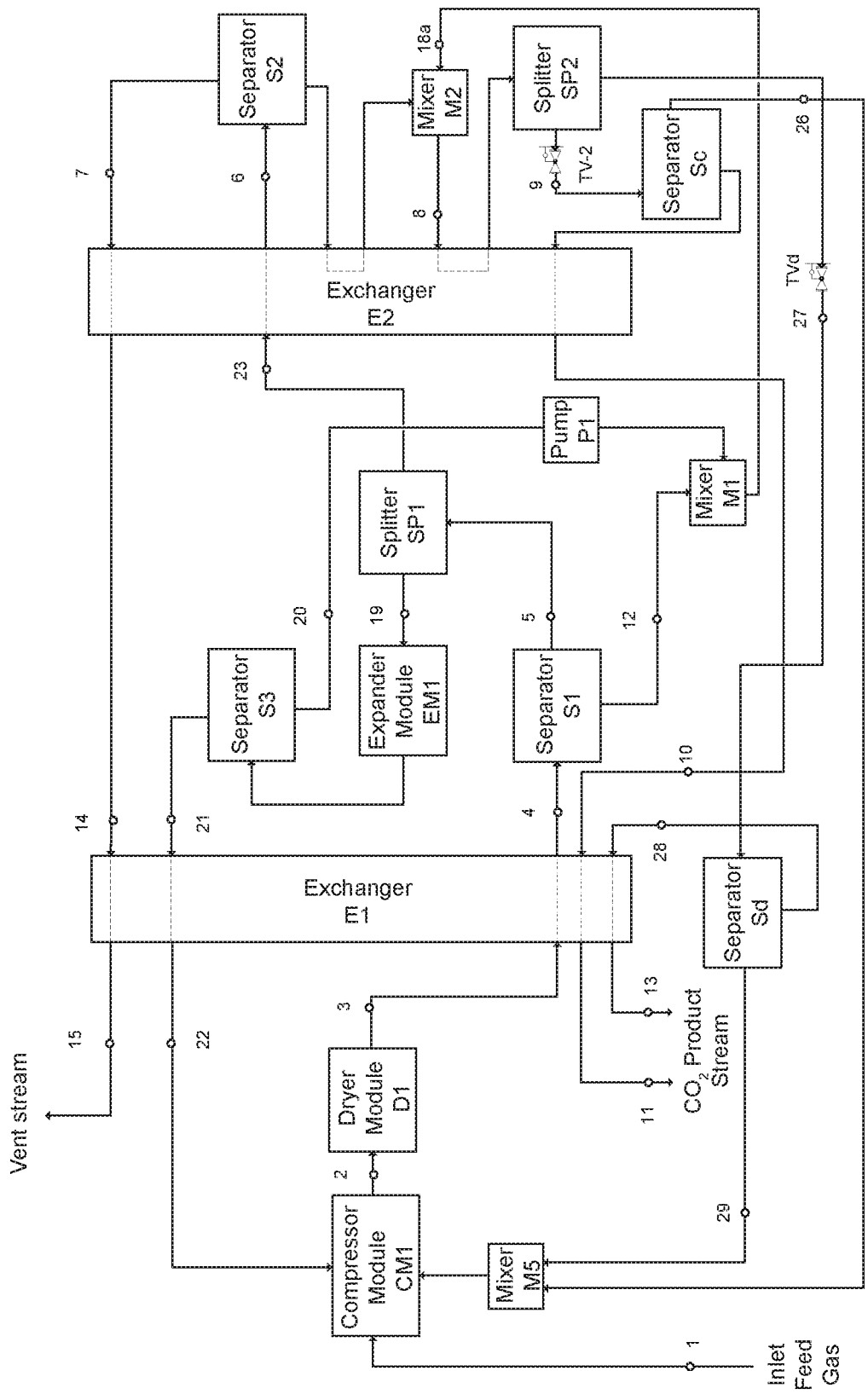
FIGS. 5 and 6 are schematic representations showing further features of the embodiment of FIG. 4.
Figure 6:
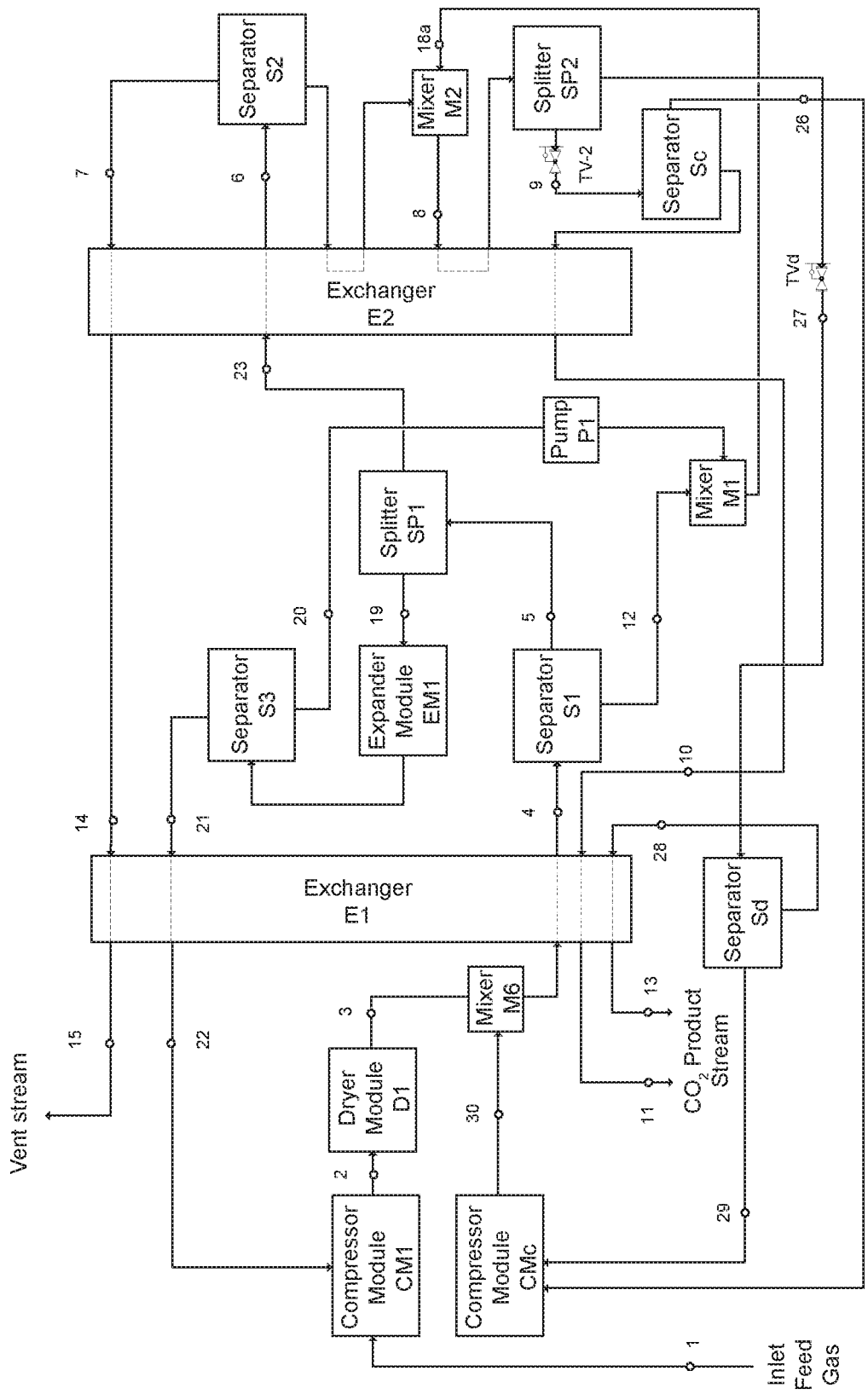

Referring now to FIGS. 4 to 6, a second embodiment of the the method and system of the invention is shown schematically, FIGS. 5 and 6 showing variants of the pathways depicted in FIG. 4.

In the configuration shown in FIG. 4, the flow from mixer M1 in path 18a is diverted to mixer M2, as in the configuration shown in FIGS. 1 to 3. However, the combined stream leaving mixer M2 in path 8 flows to splitter SP2, where it is divided into two streams, flowing in paths 9 and 27 respectively. The stream in path 9 follows the same path as in the embodiment shown in FIGS. 1 to 3, to generate the carbon dioxide product stream in paths 10 and 11. However, the stream flowing from splitter SP2 in path 27 passes through throttle valve TVc, and provides cooling energy to heat exchanger E1, before exiting the process as a second carbon dioxide product stream in path 13.

FIG. 5 is a schematic representation of a variant of the configuration of FIG. 4, in which two separators, Sc and Sd are added to the down stream flows in paths 9 and 27, respectively. The liquid stream from separator Sc flows in path 10 as a highly pure carbon dioxide product stream; similarly the liquid stream flowing from separator Sd in paths 28 and 13 is a highly pure carbon dioxide product streams. The gaseous streams (Stream 26 and Stream 29) from each of separators Sc and Sd in paths 26 and 29, respectively, are recycled back to the compressor module CM1, again at an intermediate stage, via mixer M5.

FIG. 6 is a schematic representation of a variant of the configuration of FIG. 5, in which the gaseous streams in paths 26 and 29 from the separators Sc and Sd, respectively, are compressed by an additional compressor module CMc. The compressed stream from compressor module CMc flows in path 30 to be combined with the outlet stream flowing in path 3 from dryer module DM1 in mixer M6, before entering into heat exchanger E1. This option provides the same purity of carbon dioxide in the product streams in paths 11 and 13, but provides more flexibility to the overall operation of the high purity variant processes.

For each of the configurations shown in FIGS. 4, 5 and 6, a slight variation can be achieved, in that the stream in path 8 can be diverted directly from mixer M2 to splitter SP2, instead of passing through heat exchanger E2. Other similar variations will be apparent to those with skill in the art.

Various options can be provided to the configurations shown in each of FIGS. 1 to 6. These are illustrated by the schematic representations of FIGS. 7 to 10.

Figure 7:
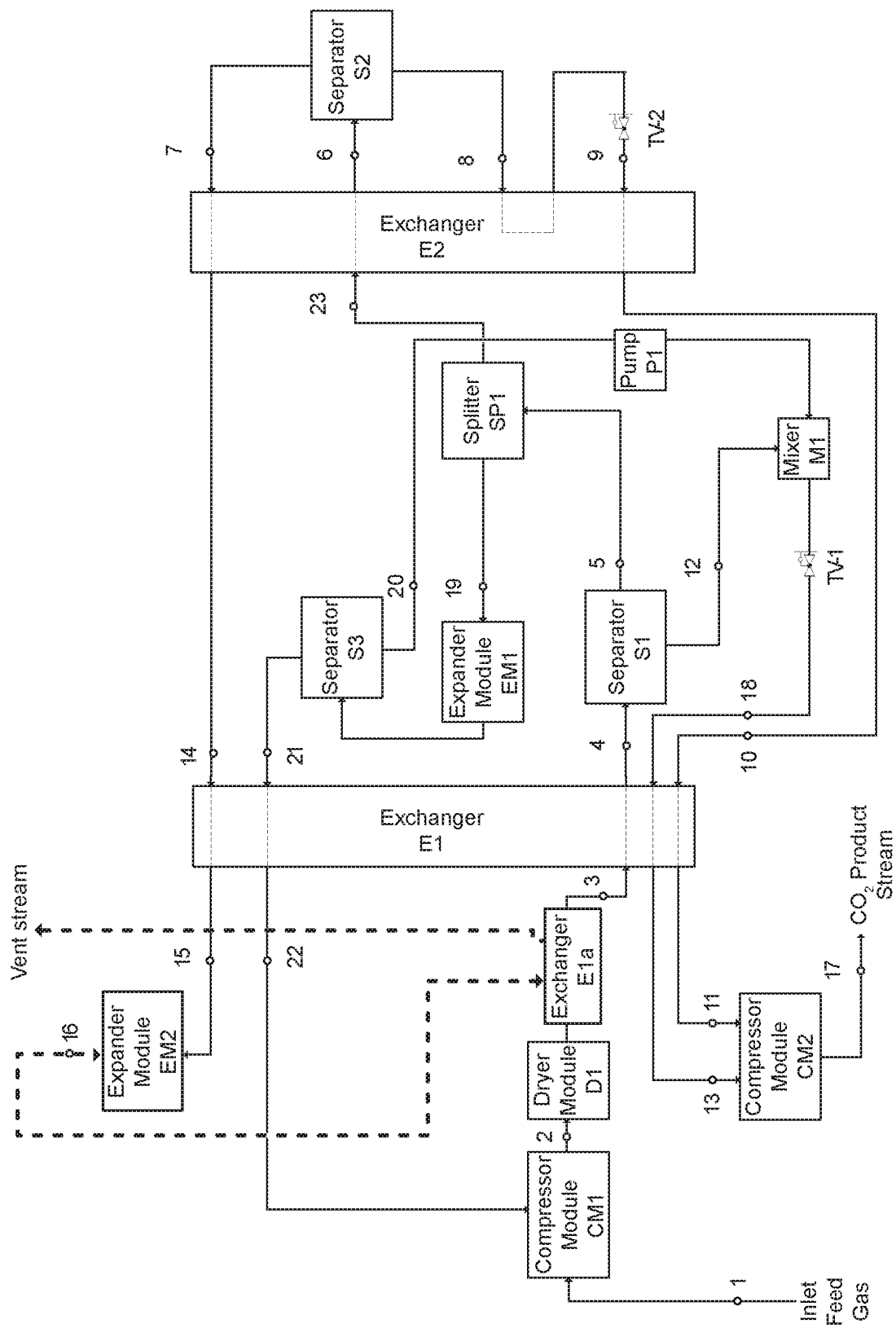
FIGS. 7 to 10 are schematic representations showing further features of embodiments of the invention.

Referring to FIG. 7, a second expander module EM2 is added to path 15 on the down stream side of heat exchanger E1, to harness more cooling energy and shaft output work, which reduces the overall energy demand and hence increases the overall efficiency of the process. In addition, the stream leaving the dryer module D1 in path 3 can be further cooled by the stream from second expander module EM2 in path 16, by the addition of heat exchanger E1a. The main advantageous features of this configuration option are:
(1) Efficient use of the cooling energy available from the expanded stream in path 16, which ensures minimum losses in the available cooling energy from the stream in path 16;
(2) The option of raising the temperature of the stream in path 16 to ambient condition before being sent to the atmosphere without using a heater; and
(3) Significant reduction of the cooling load on heat exchanger E1 due to a lower inlet temperature from the stream in path 3 compared to a configuration without this option, which allows for the use of a smaller heat exchanger E1.

Also shown in FIG. 7 is the addition of a second compressor module CM2 to the streams in paths 11 and 13 to increase the pressure of the carbon dioxide product streams in those paths to a level required for e.g. pipeline transportation. Further, considerable heating energy can also be harnessed from the inter-stage cooling of compressor module CM2 for use in another integrated energy conversion system with which the system of the present invention might be connected.

Figure 8:
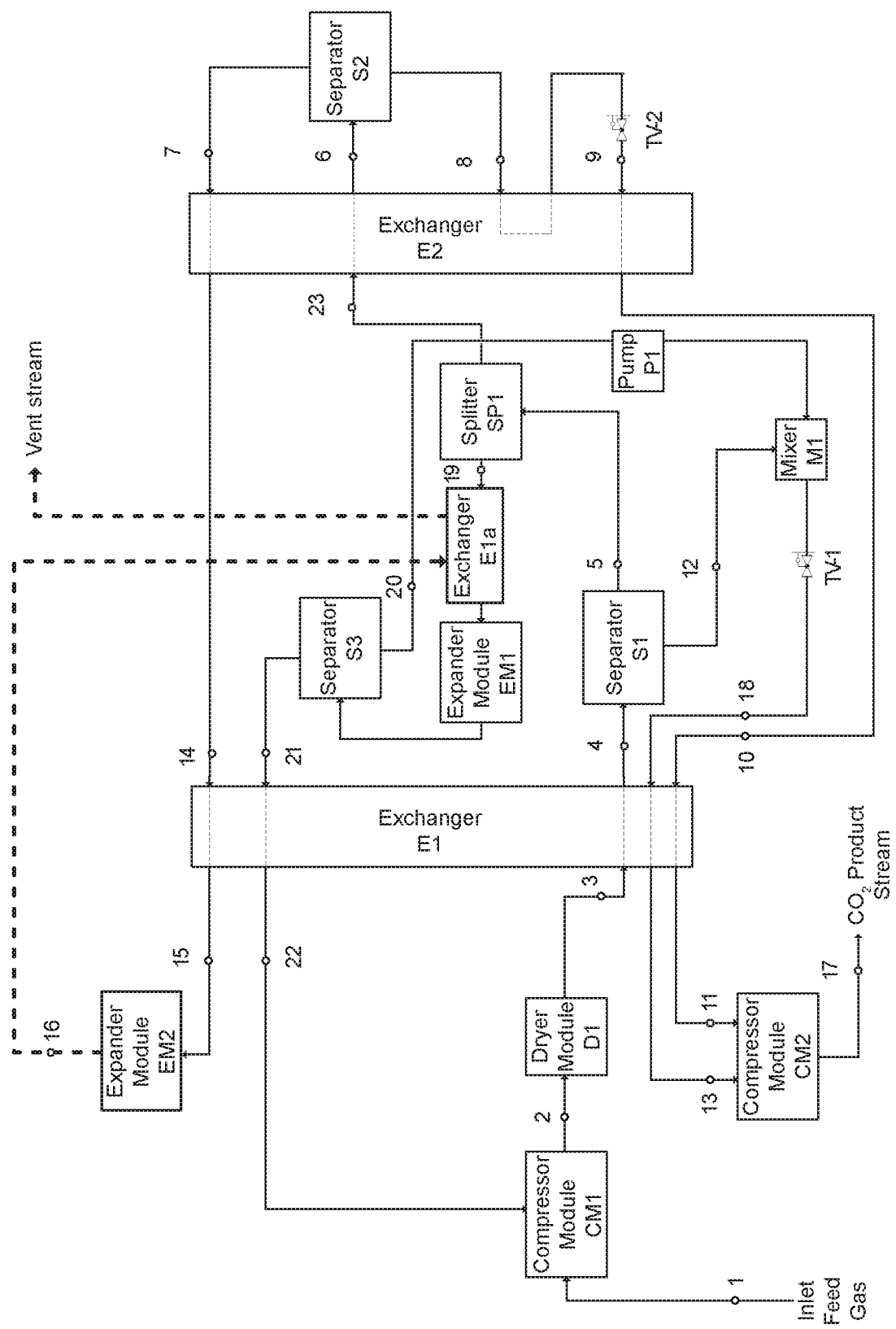

Referring now to FIG. 8, as a further option, the stream leaving splitter SP1 in path 19 can be further cooled by the stream in path 16 by the addition of heat exchanger Eta. The main features of this option are:
(1) Efficient use of the cooling energy available from the expanded stream in path 16, which ensures minimum losses in the available cooling energy from the stream in path 16; and
(2) Ability to lower the temperature of the stream in path 19 rapidly during startup of the process, to facilitate quickly reaching steady state conditions after the startup.

Figure 9:
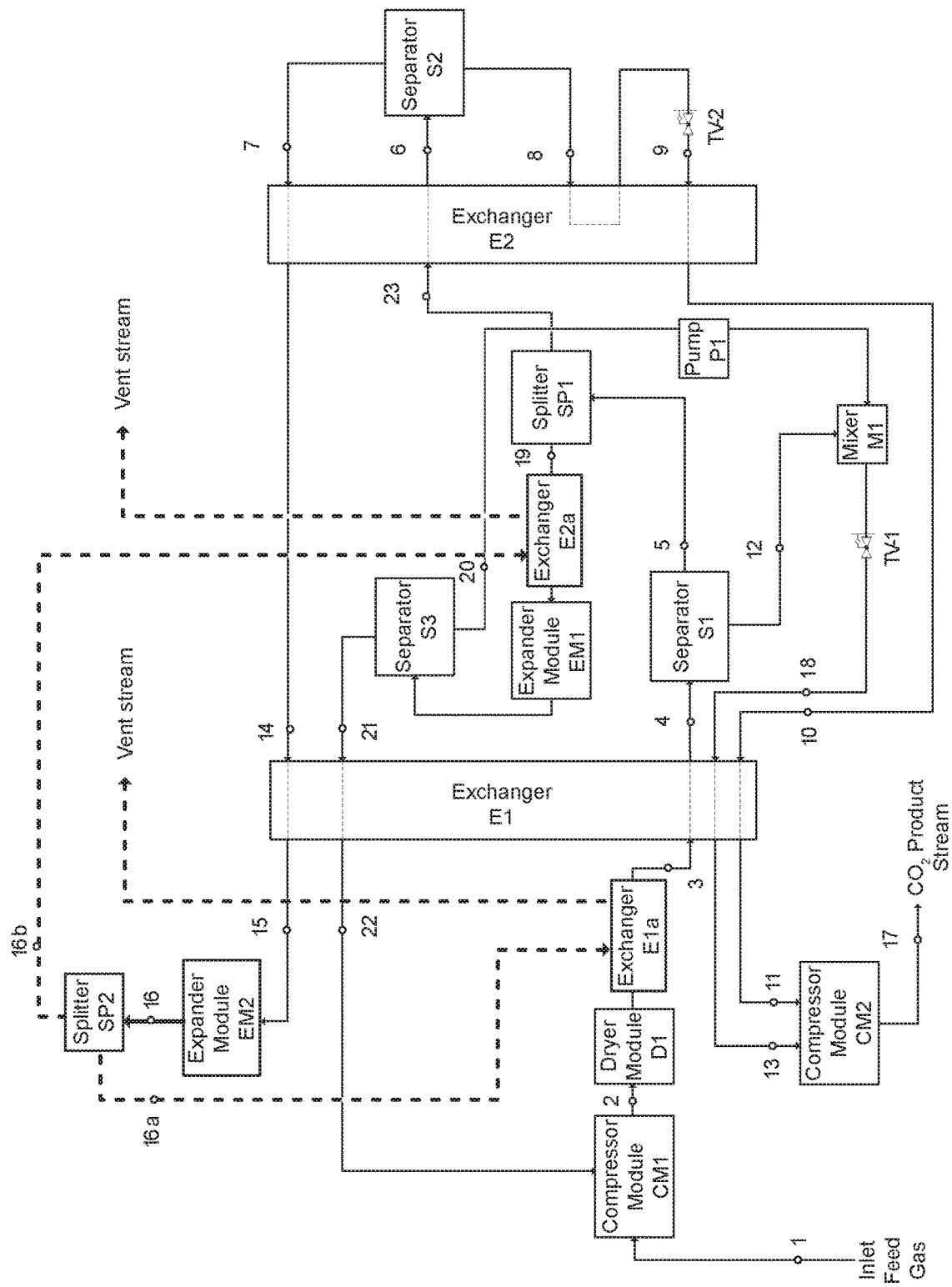

Referring now to FIG. 9, the options of FIG. 7 and FIG. 8 can be implemented simultaneously via a splitter SP2. In this configuration, splitter SP2 can be adjusted from 0 to 100% between the streams in paths 16a and 16b as desired. The main advantageous features of this option, in addition to those listed above in relation to FIGS. 7 and 8, include the important features
(1) Significant reduction of the cooling load on heat exchanger E1 and eventually on heat exchanger E2 due to a low inlet temperature from the stream in path 3, which allows for the use of smaller heat exchangers than in the configurations without this option; and
(2) Efficient and near optimum temperature control over the whole process range during startup and steady state (normal operating) conditions.

Figure 10:
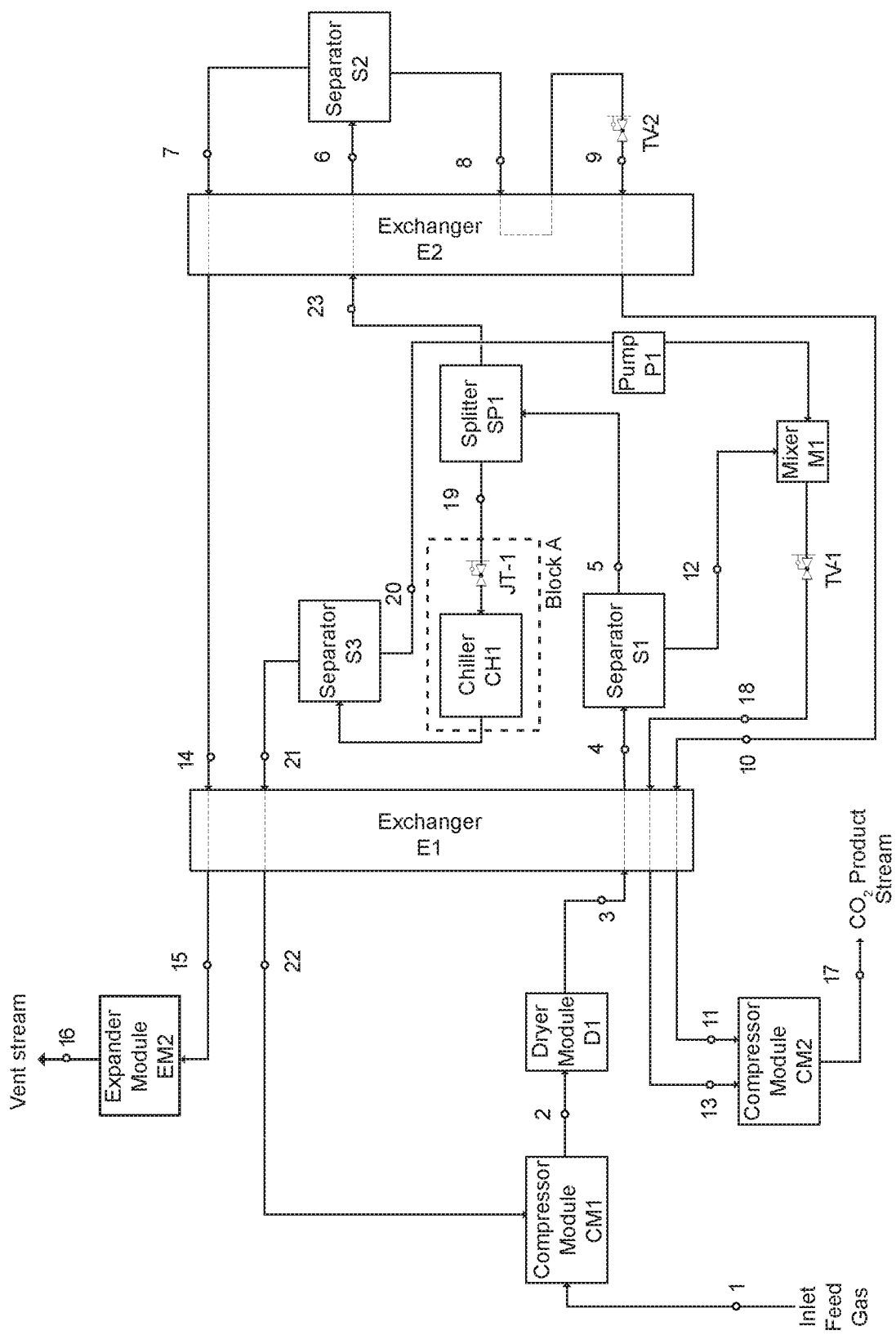

Referring now to FIG. 10, the expander module EM1, which receives the stream which flows in path 19 from splitter SP1, can be replaced by a Joule-Thompson Expansion Valve JT-1 and a chiller CH1. This option can be combined with the configurations of any of the options discussed above.

For each embodiment of the system and method of the invention, additional features are provided for the startup of operation. A configuration exemplifying the start up procedure is shown schematically in FIG. 11. In this embodiment, the pressure of the stream in path 20 is increased by any suitable pressure boosting device, such as pump P1, to match the pressure of the stream in path 12, following which the streams from paths 12 and 20 can be combined in mixer M1. The combined stream is then diverted proportionally, and the proportion can be varied between 0 and 100% as desired, so as to flow from mixer M1 in the desired proportions in paths 18 and 18a. The stream in path 18a is directed to mixer M2, and thence to heat exchanger E2 throttle valve TV2, in path 9. The stream in path 18 flows from mixer M1 to throttle valve TV1 to heat exchanger E1 and leaves as product in path 13. This diversion and subsequent throttling provides maximum cooling to produce enough liquid carbon dioxide required for throttling and stabilizing the overall process. Also, this diversion of the portion of the combined streams in paths 12 and 20 which flows in path 18, balances the overall cooling load to the individual heat exchangers E1, E2.

Figure 12:
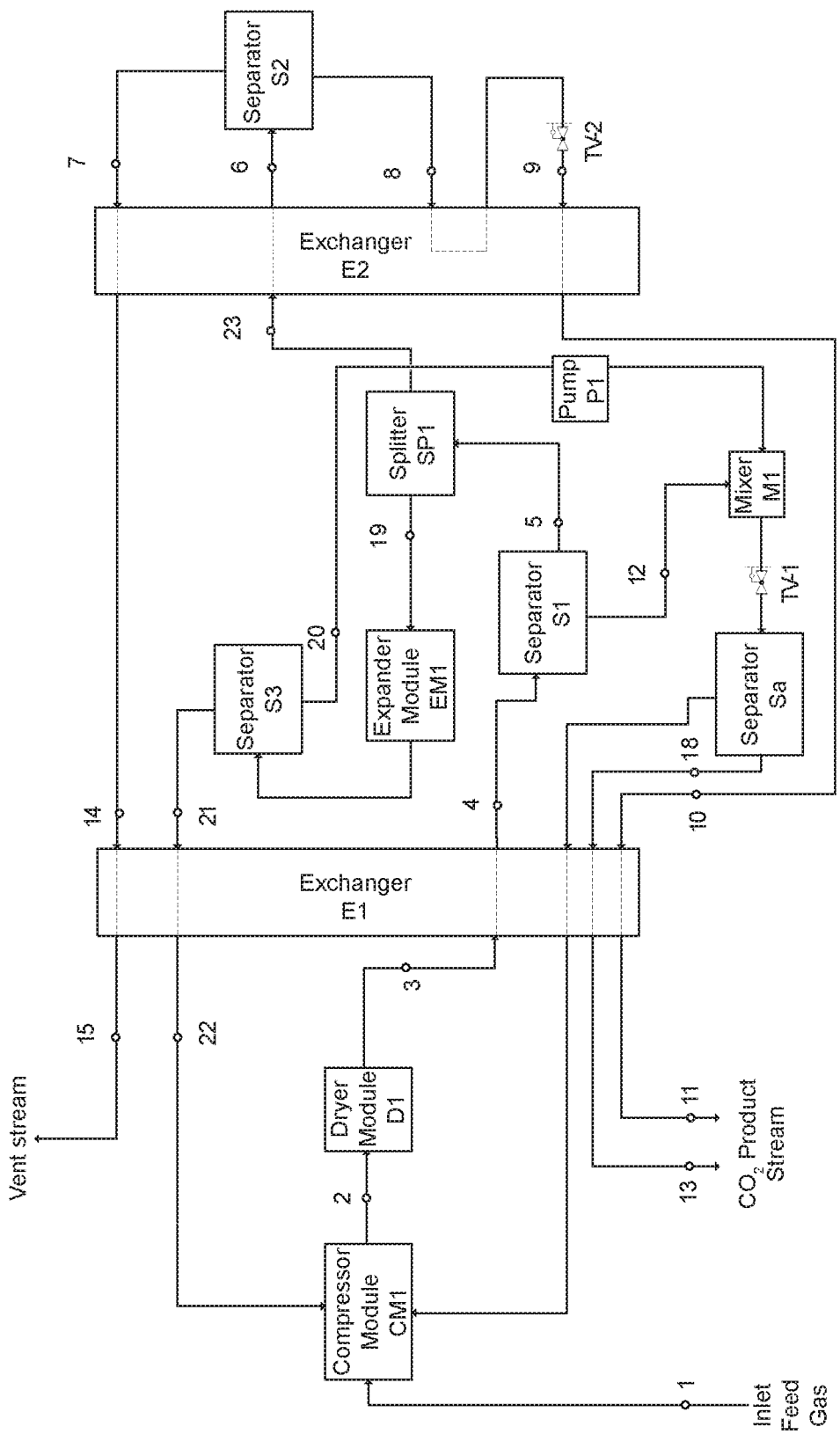
FIG. 12 is a schematic representation of a fourth embodiment of the invention.

Referring now to FIG. 12, this is a schematic representation of a configuration of an embodiment of the invention in which the carbon dioxide purity in the product stream which flows in path 13 can be greater than 98% by volume. In this configuration, an additional separator Sa is added after the throttle valve TV1. Liquid from the separator Sa is taken out as a highly pure carbon dioxide product stream in paths 13 or 18, and the gaseous stream in path 24 is recycled back to the compressor module CM1 at an intermediate stage of that module.

As further options, any of the additional optional features described above in relation to FIGS. 7 to 10 can be included in the configuration shown in FIG. 12.

Figure 11:
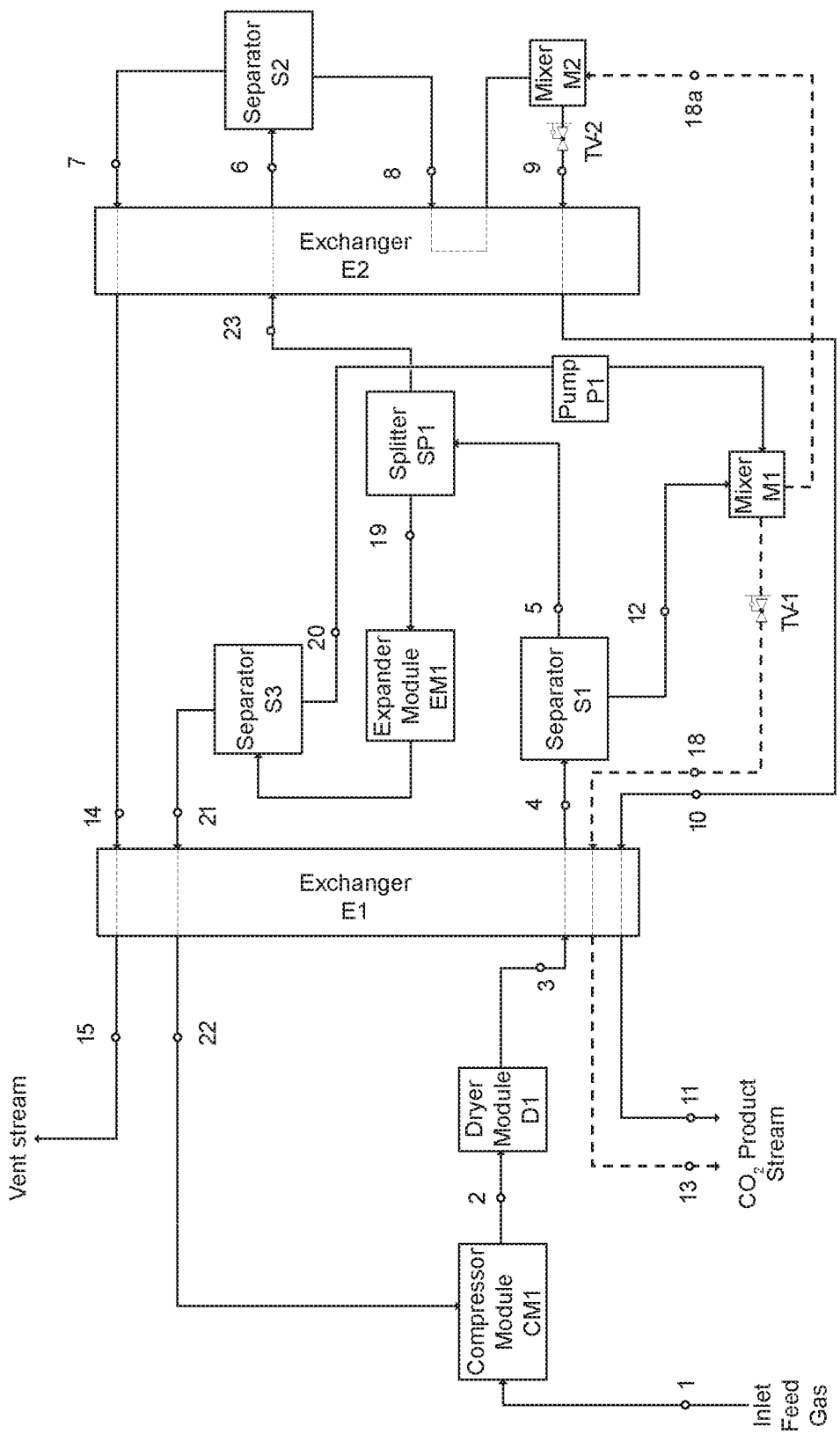
FIG. 11 is a schematic representation of a start-up feature in a third embodiment of the invention.
Figure 13:
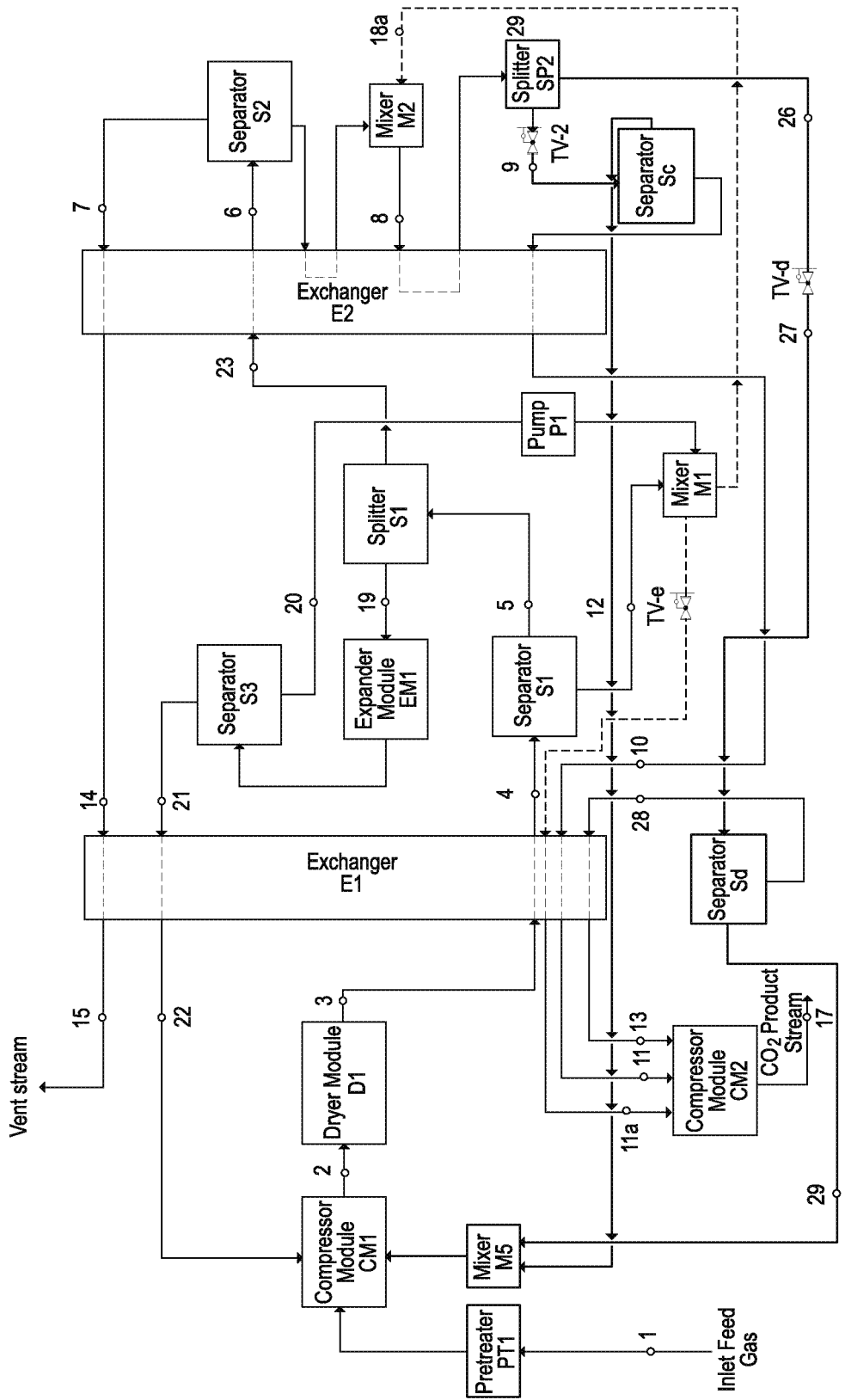
FIG. 13 is a schematic representation of a fifth embodiment of the invention.

Referring now to FIG. 13, a further embodiment is shown, in which the exemplary startup operation of FIG. 11 is shown in relation to the embodiment of FIG. 6. In this embodiment, the combined stream in mixer M1 is diverted proportionally between the stream which flows in path 18a to mixer M2, as described in relation to FIG. 11, and a second stream, which flows from mixer M1 to throttle valve Tve, and thence to heat exchanger E1, to leave the system as a third product stream in path 11a. FIG. 13 illustrates pre-treating the gas stream in a Pretreater PT1 by removing at least one of water, particulate matter, mercury and other heavy metals, hydrogen chloride, hydrogen fluoride, nitrogen oxides, sulphur oxides and other sulphur derivatives from the gas stream. FIG. 13 also illustrates raising the pressure of the first product stream to a higher set pressure to form a first pressurized product stream, raising the pressure of the second product stream to a higher set pressure to form a second pressurized product stream, and raising the pressure of the third product stream to a higher set pressure to form a third pressurized product stream with the compressor module CM2 at 17.

The embodiments described above thus provide for more efficient and cost-effective separation of carbon dioxide from carbon dioxide rich gas streams, by the use of the low-temperature gas separation processes of the invention, including the features described which provide for autorefrigeration and gas recycling, by providing compression to the inlet gas streams in multiple stages with inter-stage cooling and condensate removal, while using the energy in the compressed gas to provide cooling to the incoming stream, and at the same time using an expansion stage before recycling a portion of the gas back to the compressor, at some intermediate stage within the multiple compression stages. The invention enables the reduction of the overall energy demand and temperature of the process without the use of external refrigeration means, in a simple and compact system, without the disadvantages of known processes and systems, using the novel arrangement of process flow pathways, described above in relation to the exemplary and non-restrictive embodiments, and more fully defined in the appended claims.

We claim:

1. A method for separating carbon dioxide from a mixed gas stream, the method comprising the steps of:
   (a) providing a processing structure including a compression module comprising at least a plurality of compressors, a plurality of intercoolers with inter-stage condensate separators, the processing structure further including a plurality of flow separators, at least one stream splitter, a plurality of heat exchangers, a plurality of mixers, at least a first expander, and a throttle valve;
   (b) delivering the mixed gas stream to the compression module;
   (c) (I) compressing and cooling the mixed gas stream through each of the plurality of compressors and intercoolers in sequence to form a compressed gas stream;
   (c) (II) generating output streams from each of the plurality of heat exchangers and the first expander, the output streams each including liquid carbon dioxide and a gaseous stream;
   (d) removing the liquid carbon dioxide from each of the said output streams in first, second, and third flow separators to generate from each selected flow separator a first, second, and third, respectively, liquid carbon dioxide stream and a first, second, and third, respectively, separated gaseous stream;
   (e) mixing in a first mixer of the plurality of mixers the first and the third liquid carbon dioxide streams generated in step (d) to form a first mixed liquid carbon dioxide stream and sending at least a first portion of the first mixed liquid carbon dioxide stream through to a second mixer to mix with the second liquid carbon dioxide stream to form a second mixed liquid carbon dioxide stream;
   (f) throttling at least a portion of the second mixed liquid carbon dioxide stream from step (e) in the throttle valve;
   (g) passing at least a portion of the throttled second mixed liquid carbon dioxide stream from step (f) through the plurality of heat exchangers to form a carbon dioxide product stream and removing the carbon dioxide product stream from the processing structure;
   (h) (I) splitting the first separated gaseous stream in a first one of the at least one stream splitter to form first and second portions of a split stream;
   (h) (II) using the second separated gaseous stream to cool the first portion of the split stream;
   (h) (III) using the third separated gaseous stream to cool the compressed gas stream to form a liquid carbon dioxide portion of the output stream of a first one of the plurality of heat exchangers;
   (h) (IV) removing the second separated gaseous stream from the processing structure;
   (i) recycling the third separated gaseous stream to at least one of the compressors selected from a second compressor and a compressor thereafter in the sequence in the compression module; and
   (j) expanding in the first expander a second portion of the split stream from the selected stream splitter in step (h) (I), to recover energy and to provide cooling to the processing structure.

2. The method according to claim 1, wherein:
   (c.1) the generating step of step (c) (II) comprises passing the compressed gas stream through a first one of the heat exchangers to form a first one of the output streams comprising a first two-phase flow;
   (c.2) the removing step of step (d) comprises separating the first two-phase flow into the first liquid carbon dioxide stream comprising at least 90% carbon dioxide and the first gaseous stream including residual carbon dioxide;
   (c.3) the splitting step of step (h) (I) comprises splitting the first separated gaseous stream wherein the first portion of the split stream is a first gas stream branch and the second portion of the split stream is a second gas stream branch;
   (c.4) the generating step of step (c) (II) further comprises passing the first gas stream branch through a second one of the heat exchangers to form a second one of the output streams comprising a second two-phase flow;
   (c.5) the removing step of step (d) further comprises separating the second two-phase flow into the second liquid carbon dioxide stream comprising at least 90% carbon dioxide and the second gaseous stream including impurities and residual carbon dioxide;
   (c.6) passing the second gaseous stream in sequence through the second heat exchanger and the first heat exchanger to form a fourth gas stream comprising impurities and residual carbon dioxide;
   (c.7) the generating step of step (c) (II) further comprises expanding the second gas stream branch to produce a third one of the output streams comprising a third two-phase flow;
   (c.8) the removing step of step (d) further comprises separating the third two-phase flow into the third liquid carbon dioxide stream comprising at least 90% carbon dioxide and the third gaseous stream including residual carbon dioxide;

(c.9) passing the third gaseous stream through the first heat exchanger;

(c.10) passing the third liquid carbon dioxide stream through a pressurizing means to raise the pressure of the third liquid carbon dioxide stream to match the pressure of the first liquid carbon dioxide stream, and thereafter performing the step of mixing the first liquid carbon dioxide stream with the third liquid carbon dioxide stream in the first mixer to form the first mixed liquid carbon dioxide stream;

(c.11) passing the second liquid carbon dioxide stream through the second heat exchanger;

(c.12) the throttling step of step (f) comprises passing the at least a portion of the second mixed liquid carbon dioxide stream through the throttle valve to form a first cold throttled stream including a gaseous portion and a liquid portion; and (c.13) the passing step of step (g) comprises passing at least a portion of the first cold throttled stream through the second heat exchanger and the first heat exchanger, in sequence, to form the carbon dioxide product stream comprising at least 90% carbon dioxide.

3. The method according to claim 2, further comprising the step of expanding the fourth gas stream in a vent stream expander to recover energy and to form a vent stream comprising impurities and residual carbon dioxide.

4. The method according to claim 3, further comprising splitting the vent stream into a first vent stream branch and a second vent stream branch.

5. The method according to claim 4, wherein, also after step (b) and before passing the compressed gas stream through one of the plurality of heat exchangers, passing the compressed gas stream through a first additional heat exchanger, and passing the first vent stream branch through the first additional heat exchanger.

6. The method according to claim 4, further including passing the second gas stream branch through a second additional heat exchanger and passing the second vent stream branch through the second additional heat exchanger.

7. The method according to claim 2, further comprising after step (c.13), the step of raising the pressure of the product stream to higher set pressure to form a pressurized product stream.

8. The method according to claim 2, wherein expanding the second portion of the split stream, which is the second gas stream branch of step (c.7), comprises expanding the second gas stream branch in the first expander to recover energy, and to produce the third two-phase flow.

9. The method according to claim 3, wherein expanding the second portion of the split stream, which is the second gas stream branch of step (c.7), comprises expanding the second gas stream branch in the first expander to recover energy, and to produce the third two-phase flow.

10. The method according to claim 2, further comprising removing oxygen from selected ones of each of the product or vent streams before removing the selected streams from the processing structure.

11. The method according to claim 3, further comprising removing oxygen from selected ones of each of the product or vent streams before removing the selected streams from the processing structure.

12. The method according to claim 1, further comprising pre-treating the mixed gas stream by removing at least one of water, particulate matter, mercury and other heavy metals, hydrogen chloride, hydrogen fluoride, nitrogen oxides, sulphur oxides and other sulphur derivatives from the mixed gas stream.

13. The method according to claim 2, further comprising, before passing the compressed gas stream through any of the plurality of heat exchangers to generate the output streams, drying the compressed gas stream to form a dried compressed gas stream having a dew point temperature at least one degree C. lower than a lowest operational temperature of each of the steps of the method.

14. The method according to claim 2, further including removing the fourth gas stream out of the processing structure.

15. The method according to claim 2, further including passing the second mixed liquid carbon dioxide stream through a second one of the at least one stream splitter to form the at least the portion of the second mixed liquid carbon dioxide stream and a splitted portion of the second mixed liquid carbon dioxide stream.

16. The method according to claim 15, further including recycling a first part of the splitted portion of the second mixed liquid carbon dioxide stream and a first part of the at least the portion of the second mixed liquid carbon dioxide stream by compressing and then mixing with the compressed gas stream, and removing a second part of the splitted portion of the second mixed liquid carbon dioxide stream and a second part of the at least the portion of the second mixed liquid carbon dioxide stream out of the processing structure.

17. The method according to claim 1, further including passing a second portion of the first mixed liquid carbon dioxide stream mixed in step (f) through at least one of the plurality of heat exchangers to form a second carbon dioxide product stream and removing the second carbon dioxide product stream from the processing structure.

18. A system for separating carbon dioxide from a mixed gas stream, the system comprising:
a processing structure including a compression module comprising at least a plurality of compressors, a plurality of intercoolers with inter-stage condensate separators, the processing structure further including a plurality of flow separators, at least one stream splitter, a plurality of heat exchangers, a plurality of mixers, at least a first expander, and a throttle valve;
the mixed gas stream being delivered to the compression module;
the mixed gas stream being compressed and cooled through each of the plurality of compressors and intercoolers in sequence to form a compressed gas stream;
output streams are generated from each of the plurality of heat exchangers and the first expander, the output streams each including liquid carbon dioxide and a gaseous stream;
the liquid carbon dioxide is removed from each of the said output streams in first, second, and third flow separators to generate from each selected flow separator a first, second, and third, respectively, liquid carbon dioxide stream and a first, second, and third, respectively, separated gaseous stream;
a first mixer of the plurality of mixers mixing the first and the third liquid carbon dioxide streams to form a first mixed liquid carbon dioxide stream;
at least a first portion of the first mixed liquid carbon dioxide stream is sent through to a second mixer to mix with the second liquid carbon dioxide stream to form a second mixed liquid carbon dioxide stream;

at least a portion of the second mixed liquid carbon dioxide stream is mixed in the throttle valve;

at least a portion of the throttled second mixed liquid carbon dioxide stream is passed through the plurality of heat exchangers to form a carbon dioxide product stream and the carbon dioxide product stream is removed from the processing structure;

the first separated gaseous stream is split in a first one of the at least one stream splitter to form first and second portions of a split stream;

the second separated gaseous stream is used to cool the first portion of the split stream;

the third separated gaseous stream is used to cool the compressed gas stream to form a liquid carbon dioxide portion of the output stream of a first one of the plurality of heat exchangers;

the second separated gaseous stream is removed from the processing structure;

the third separated gaseous stream is recycled to at least one of the compressors selected from a second compressor and a compressor thereafter in the sequence in the compression module; and a second portion of the split stream from the selected stream splitter is expanded to recover energy and to provide cooling to the processing structure.

\* \* \* \* \*